US012572736B2

(12) United States Patent
Joseph et al.

(10) Patent No.: US 12,572,736 B2
(45) Date of Patent: Mar. 10, 2026

(54) SYSTEMS AND METHODS FOR AUGMENTING RARE DISEASE DICTIONARIES

(71) Applicant: Tata Consultancy Services Limited, Mumbai (IN)

(72) Inventors: Thomas Joseph, Bangalore (IN); Aditya Ramakrishna Rao, Bangalore (IN); Rajgopal Srinivasan, Hyderabad (IN); Sujatha Kotte, Chennai (IN); Naveen Sivadasan, Hyderabad (IN); Saipradeep Govindakrishnan Vangala, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 181 days.

(21) Appl. No.: 18/660,035

(22) Filed: May 9, 2024

(65) Prior Publication Data

US 2024/0403555 A1 Dec. 5, 2024

(30) Foreign Application Priority Data

May 29, 2023 (IN) .............................. 202321036994

(51) Int. Cl.
G06F 40/242 (2020.01)
G06F 40/30 (2020.01)
(52) U.S. Cl.
CPC ............ G06F 40/242 (2020.01); G06F 40/30 (2020.01)
(58) Field of Classification Search
CPC ...... G06F 40/242; G06F 40/30; G06F 40/211; G06F 40/295; G06F 40/284; G06N 3/045;
(Continued)

(56) References Cited

U.S. PATENT DOCUMENTS

| | | | | |
|---|---|---|---|---|
| 11,023,679 B2 * | 6/2021 | Allen | .................... | G06F 40/247 |
| 11,308,289 B2 * | 4/2022 | Jiang | .................... | G06F 40/237 |
| 2020/0176098 A1 * | 6/2020 | Lucas | .................... | G06F 40/30 |

FOREIGN PATENT DOCUMENTS

CN 112687397 A 5/2023

OTHER PUBLICATIONS

Mart'inez-Demiguel, Claudia et al., "The RareDis corpus: a corpus annotated with rare diseases, their signs and symptoms", Title of the item: Journal of Biomedical Informatics, Date: 2021, Link: https://arxiv.org/pdf/2108.01204.

(Continued)

*Primary Examiner* — Abul K Azad
(74) *Attorney, Agent, or Firm* — FINNEGAN, HENDERSON, FARABOW, GARRETT & DUNNER LLP

(57) ABSTRACT

Comprehensive and high-quality disease dictionaries are invaluable resources for tasks such as building ontologies, automated relation extraction, text summarization, question answering etc. Such curated resources are useful to clinicians, researchers, and various Biomedical Natural Language Processing tasks. However, these are manually curated and are labor and time intensive, and additionally suffer from lower recall and coverage is also less. Present disclosure provides systems and methods for augmenting rare disease dictionaries, wherein the system retrieves (new) rare diseases terms from medical literature that are related to the given dictionary terms (seed terms) and recommends new terms (or NPs) in a ranked order. This method is useful for rare diseases dictionary augmentation as a significant fraction of the top recommendations are new synonym candidates for dictionary augmentation. The method uses syntactic and semantic similarity measures in combination with efficient nearest neighbor search for efficient retrieval.

20 Claims, 3 Drawing Sheets

(58) Field of Classification Search
CPC .......... G06N 3/08; G06N 5/022; G06N 20/00;
G06N 7/01; G16H 50/20; G16H 70/60;
G16H 50/70
See application file for complete search history.

(56) References Cited

OTHER PUBLICATIONS

Holat, Pierre et al., "Weakly-supervised Symptom Recognition for Rare Diseases in Biomedical Text", Date: 2018, Publisher: HAL Open Science, Link: https://shs.hal.science/halshs-01727071/document.

Segura-Bedmar, Isabel et al., "Exploring deep learning methods for recognizing rare diseases and their clinical manifestations from texts", Title of the item: BMC Bioinformatics, Date: 2022, Publisher: BMC, Link: https://bmcbioinformatics.biomedcentral.com/articles/10.1186/s12859-022-04810-y.

* cited by examiner

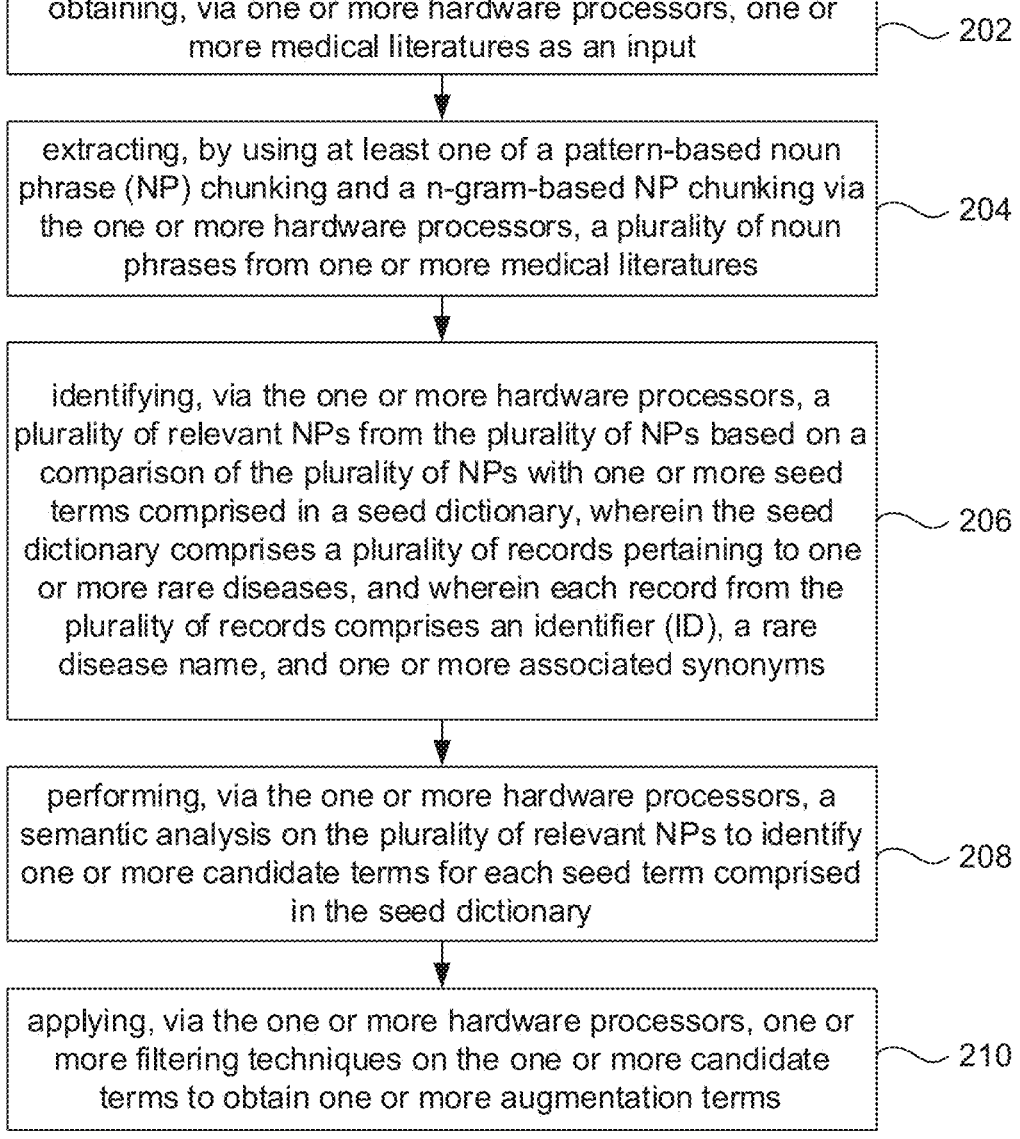

obtaining, via one or more hardware processors, one or more medical literatures as an input ⟶ 202 extracting, by using at least one of a pattern-based noun phrase (NP) chunking and a n-gram-based NP chunking via the one or more hardware processors, a plurality of noun phrases from one or more medical literatures ⟶ 204 identifying, via the one or more hardware processors, a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms ⟶ 206 performing, via the one or more hardware processors, a semantic analysis on the plurality of relevant NPs to identify one or more candidate terms for each seed term comprised in the seed dictionary ⟶ 208 applying, via the one or more hardware processors, one or more filtering techniques on the one or more candidate terms to obtain one or more augmentation terms ⟶ 210

FIG. 3

SYSTEMS AND METHODS FOR AUGMENTING RARE DISEASE DICTIONARIES

PRIORITY CLAIM

This U.S. patent application claims priority under 35 U.S.C. § 119 to: Indian patent application No. 202321036994, filed on May 29, 2023. The entire contents of the aforementioned application are incorporated herein by reference.

TECHNICAL FIELD

The disclosure herein generally relates to Biomedical Natural Language Processing (BioNLP) techniques, and, more particularly, to systems and methods for augmenting rare disease dictionaries using BioNLP techniques.

BACKGROUND

Comprehensive and high-quality disease dictionaries are invaluable resources for a variety of tasks such as building ontologies, automated relation extraction, text summarization, question answering etc. Such curated resources are useful to clinicians and researchers as well as useful in various Biomedical Natural Language Processing (BioNLP) tasks. Usage of manually curated entity dictionaries for entity recognition text mining tasks generally are of high precision. However, manual curation is labor and time intensive and suffers from lower recall. While the candidate terms obtained through manual curation may be of high accuracy, the time taken is huge and coverage is less.

SUMMARY

Embodiments of the present disclosure present technological improvements as solutions to one or more of the above-mentioned technical problems recognized by the inventors in conventional systems.

For example, in one aspect, there is provided a processor implemented method for augmenting rare disease dictionaries. The method comprises obtaining, via one or more hardware processors, one or more medical literatures as an input; extracting, by using at least one of a pattern-based noun phrase (NP) chunking and a n-gram-based NP chunking via the one or more hardware processors, a plurality of NPs from one or more medical literatures; identifying, via the one or more hardware processors, a plurality of relevant NPs from the plurality of noun phrases based on a comparison of the plurality of noun phrases with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms; performing, via the one or more hardware processors, a semantic analysis on the plurality of relevant NPs to identify one or more candidate terms for each seed term comprised in the seed dictionary; and applying, via the one or more hardware processors, one or more filtering techniques on the one or more candidate terms to obtain one or more augmentation terms.

In an embodiment, the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus.

In an embodiment, the comparison comprises performing a syntactic overlapping of the plurality of NPs with the seed dictionary.

In an embodiment, the one or more relevant NPs have at least a pre-defined syntactic overlap with the seed dictionary.

In an embodiment, the step of performing the semantic analysis on the plurality of relevant NPs to identify the one or more candidate terms for each seed term comprised in the seed dictionary comprises: obtaining word2vec vectors for each relevant NP from the plurality of relevant noun phrases and each seed term comprised in the seed dictionary, by using a word2vec embedding technique; computing, for each relevant NP, one or more k-nearest neighbors from each seed term comprised in the seed dictionary; and applying a cosine similarity function and a Euclidean distance to the one or more k-nearest neighbors from each relevant NP amongst the plurality of relevant NPs to identify the one or more candidate terms.

In an embodiment, the one or more filtering techniques comprise at least one of an inflection technique, a plural form identification technique, a difference technique, and a special character identification technique.

In an embodiment, the step of obtaining, via one or more hardware processors, one or more medical literatures as the input is preceded by selecting, via the one or more hardware processors, a pre-defined rare disease database from a plurality of rare disease databases; and generating, via the one or more hardware processors, the seed dictionary for the one or more rare diseases, using the pre-defined rare disease database.

In an embodiment, the method further comprises augmenting the seed dictionary with the one or more augmentation terms associated with the one or more rare diseases terms.

In another aspect, there is provided a processor implemented system for augmenting rare disease dictionaries. The system comprises: a memory storing instructions; one or more communication interfaces; and one or more hardware processors coupled to the memory via the one or more communication interfaces, wherein the one or more hardware processors are configured by the instructions to: obtain one or more medical literatures as an input; extracting, by using at least one of a pattern-based NP chunking and a n-gram-based NP chunking, a plurality of NPs from one or more medical literatures; identifying a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms; performing a semantic analysis on the plurality of relevant NPs to identify one or more candidate terms for each seed term comprised in the seed dictionary; and applying one or more filtering techniques on the one or more candidate terms to obtain one or more augmentation terms.

In an embodiment, the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus.

3

In an embodiment, the comparison comprises performing a syntactic overlapping of the plurality of NPs with the seed dictionary.

In an embodiment, the one or more relevant NPs have at least a pre-defined syntactic overlap with the seed dictionary.

In an embodiment, the one or more candidate terms for each seed term comprised in the seed dictionary are identified by: obtaining word2vec vectors for each relevant NP from the plurality of relevant NPs and each seed term comprised in the seed dictionary, by using a word2vec embedding technique; computing, for each relevant NP, one or more k-nearest neighbors from each seed term comprised in the seed dictionary; and applying a cosine similarity function and a Euclidean distance to the one or more k-nearest neighbors from each relevant NP amongst the plurality of relevant NPs to identify the one or more candidate terms.

In an embodiment, the one or more filtering techniques comprise at least one of an inflection technique, a plural form identification technique, a difference technique, and a special character identification technique.

In an embodiment, prior to obtaining the one or more medical literatures the one or more hardware processors is configured to select a pre-defined rare disease database from a plurality of rare disease databases; and generate the seed dictionary for the one or more rare diseases, using the pre-defined rare disease database.

In an embodiment, the one or more hardware processors are further configured by the instructions to augment the seed dictionary with the one or more augmentation terms associated with one or more rare disease terms.

In yet another aspect, there are provided one or more non-transitory machine-readable information storage mediums comprising one or more instructions which when executed by one or more hardware processors cause augmenting rare disease dictionaries by: obtaining one or more medical literatures as an input; extracting, by using at least one of a pattern-based NP chunking and a n-gram-based NP chunking, a plurality of NPs from one or more medical literatures; identifying a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms; performing a semantic analysis on the plurality of relevant NPs to identify one or more candidate terms for each seed term comprised in the seed dictionary; and applying one or more filtering techniques on the one or more candidate terms to obtain one or more augmentation terms.

In an embodiment, the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus.

In an embodiment, the comparison comprises performing a syntactic overlapping of the plurality of NPs with the seed dictionary.

In an embodiment, the one or more relevant NPs have at least a pre-defined syntactic overlap with the seed dictionary.

In an embodiment, the step of performing the semantic analysis on the plurality of relevant NPs to identify the one or more candidate terms for each seed term comprised in the seed dictionary comprises: obtaining word2vec vectors for each relevant NP from the plurality of relevant NPs and each seed term comprised in the seed dictionary, by using a word2vec embedding technique; computing, for each relevant NP, one or more k-nearest neighbors from each seed term comprised in the seed dictionary; and applying a cosine similarity function and a Euclidean distance to the one or more k-nearest neighbors from each relevant NP amongst the plurality of relevant NPs to identify the one or more candidate terms.

In an embodiment, the one or more filtering techniques comprise at least one of an inflection technique, a plural form identification technique, a difference technique, and a special character identification technique.

In an embodiment, the step of obtaining, via one or more hardware processors, one or more medical literatures as the input is preceded by selecting, via the one or more hardware processors, a pre-defined rare disease database from a plurality of rare disease databases; and generating, via the one or more hardware processors, the seed dictionary for the one or more rare diseases, using the pre-defined rare disease database.

In an embodiment, the instructions which when executed by the one or more hardware processors further cause augmenting the seed dictionary with the one or more augmentation terms associated with one or more rare disease terms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 depicts an exemplary flow chart illustrating a method for augmenting rare disease dictionaries, using the systems of FIG. 1-2, in accordance with an embodiment of the present disclosure.

DETAILED DESCRIPTION

Figure 1:
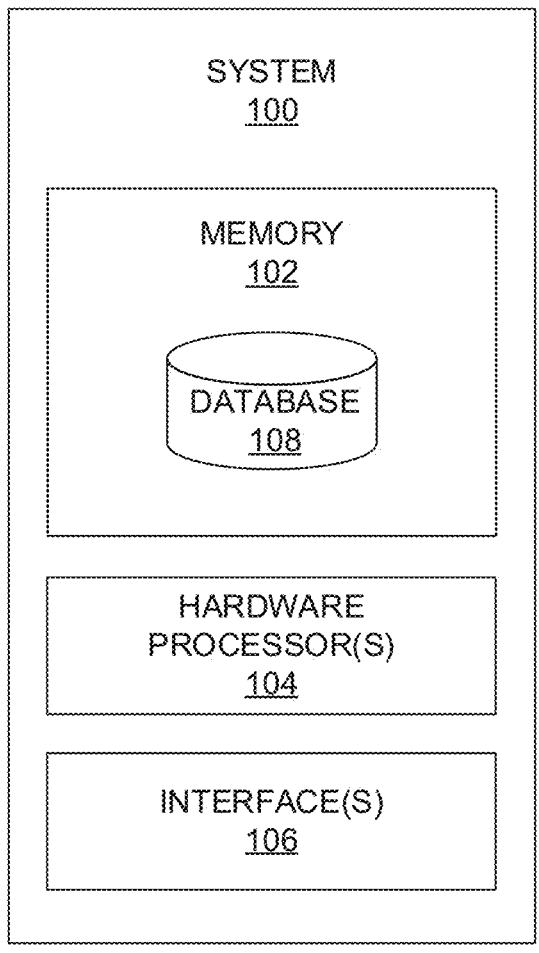
FIG. 1 depicts an exemplary system for augmenting rare disease dictionaries, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As mentioned earlier, comprehensive, and high-quality entity dictionaries such as disease dictionaries are invaluable resources for a variety of tasks such as building ontologies, automated relation extraction, text summarization, question answering etc. Such cu-rated resources are useful to clinicians and researchers as well as useful in the various Biomedical Natural Language Processing (BioNLP) tasks. Usage of manually curated entity dictionaries for entity recognition text mining tasks generally are of high precision. However, manual curation is labor and time intensive and suffers from lower recall. Automated pipelines that aid in dictionary augmentation by identifying additional dictionary terms from literature can significantly help in improving recall when the dictionaries are used in text mining tasks. Furthermore, automated identification of candidate terms from literature can considerably reduce effort in curation and ontology building by reducing the time and effort involved in document triage. For rare disease studies, there are several comprehensive rare disease resources available. Notable among them are Online Mendelian Inheritance in Man (OMIM), the Genetic and Rare Diseases Information Center (GARD), National Organization for Rare Disorders (NORD) and Orphanet.

These resources are partially cross-referenced among themselves, as well as to more general disease resources and terminologies (e.g., Rance et al, 2013). However, manual curation efforts limit recall of many of these. Unstructured resources such as biomedical literature are central to biocuration efforts since a significant amount of information is present predominantly in text articles (e.g., Bravo et al, 2014). Rare diseases dictionaries pose additional challenges because the wide range of rare disease mentions in the literature are often complex and lengthy.

Embodiments of the present disclosure present system and method for augmenting rare disease dictionaries. More specifically, the system and method of the present disclosure described herein build a text-mining pipeline that retrieves (new) rare diseases terms from medical literature (e.g., such as MEDLINE, and the like) that are related to a given set of dictionary terms (e.g., seed terms) and recommends the new terms (or NPs) in a ranked order. The pipeline uses syntactic and semantic similarity measures in combination with efficient nearest neighbor search for efficient retrieval. The system and method demonstrate the utility of the above-mentioned pipeline in augmenting the Orphanet rare diseases dictionary.

Figure 2:
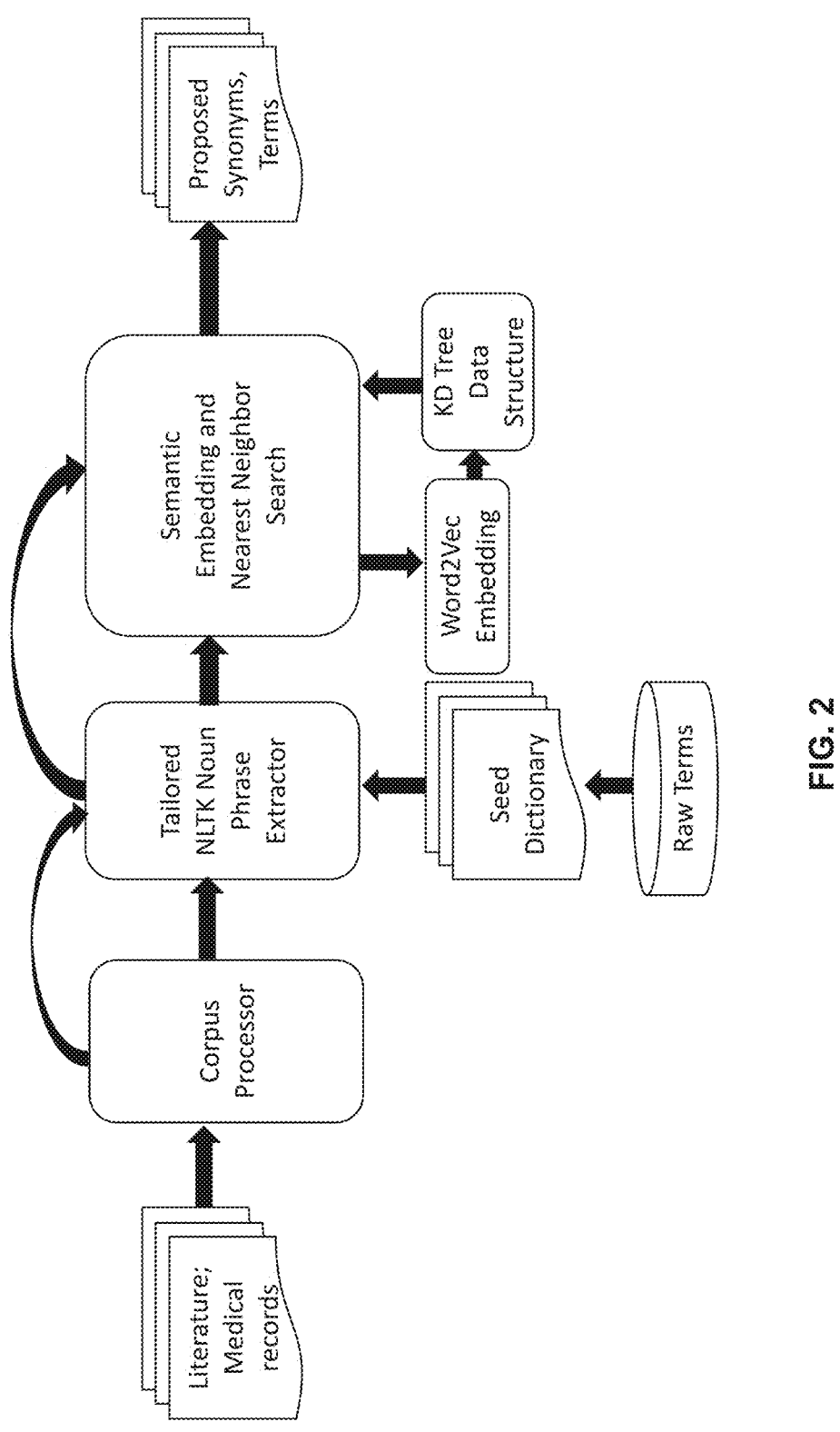
FIG. 2 depicts an exemplary high level block diagram of the system of FIG. 1 for augmenting rare disease dictionaries, in accordance with an embodiment of the present disclosure.

Referring now to the drawings, and more particularly to FIGS. 1 through 3 where similar reference characters denote corresponding features consistently throughout the figures, there are shown preferred embodiments and these embodiments are described in the context of the following exemplary system and/or method.

FIG. 1 depicts an exemplary system 100 for augmenting rare disease dictionaries, in accordance with an embodiment of the present disclosure. In an embodiment, the system 100 may also be referred as 'dictionary augmentation system', or 'augmentation system' and interchangeably used herein. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises medical literatures, a plurality of noun phrases (NPs), seed terms, one or more seed dictionaries comprising records with identifiers, rare disease names, and associated synonyms. The database 108 further comprises a plurality of candidate terms, a plurality of augmentation terms, and the like. The memory 102 further comprises one or more techniques such as a pattern-based NP chunking and a n-gram-based NP chunking, one or more filtering techniques such as, but are not limited to, an inflection technique, a plural form identification technique, a difference technique, a special character identification technique, and the like. The above-mentioned techniques when executed by the hardware processors 104 enable the system 100 to perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

FIG. 2, with reference to FIG. 1, depicts an exemplary high level block diagram of the system 100 for augmenting rare disease dictionaries, in accordance with an embodiment of the present disclosure.

FIG. 3, with reference to FIGS. 1-2, depicts an exemplary flow chart illustrating a method for augmenting rare disease dictionaries, using the systems of FIG. 1-2, in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the block diagram of the system 100 depicted in FIG. 2, and the flow diagram as depicted in FIG. 3.

At first, a seed dictionary is created/generated by the system 100 of the present disclosure prior to performing the steps of FIG. 3. The system 100 and method select a pre-defined rare disease database from a plurality of rare disease databases. For instance, in the present disclosure, the system 100 selected Orphanet as the rare disease database amongst many other rare disease databases as known in the art. Orphanet is a publicly available and comprehensive data source/database for rare diseases terms. Further, the seed dictionary is created for the one or more rare diseases, using the pre-defined rare disease database (Orphanet). The seed dictionary is created/generated by removing obsolete and duplicate terms from the raw terms (such as medical terms) from the pre-defined rare disease database (Orphanet) as depicted in FIG. 2. The seed dictionary comprises a plurality of records and each record amongst the plurality of each record comprises a rare disease identifier (ID), a rare disease name, and one or more associated synonyms. In the present disclosure, the seed dictionary derived/created from the pre-defined rare disease database (Orphanet) consisted of a total of 23,228 seed terms that map to 10,217 Orphanet IDs. It is to be understood by a person having ordinary skill in the art or person skilled in the art that the seed dictionary is created one time and is periodically updated.

Once the seed dictionary is created by the system 100, at step 202 of the method of the present disclosure, the one or more hardware processors 104 (e.g., corpus processor as depicted in FIG. 2) obtain one or more medical literatures as an input. As mentioned above, the system 100 and the method require the seed dictionary, for which the method retrieves candidate terms from the one or more medical literatures (e.g., MEDLINE) or any other (medical) sources (e.g., a magazine from a healthcare domain). It is to be understood by a person having ordinary skill in the art or person skilled in the art that the system and method is capable of receiving other literature articles, which are either in abstract format or full text. Such medical literatures serving as input to the system shall not be construed as limiting the scope of the present disclosure.

At step 204 of the method of the present disclosure, the one or more hardware processors 104 extracting, by using at least one of a pattern-based NP chunking (also referred as chunkers and interchangeably used herein) and a n-gram-based NP chunking (also referred as chunkers and interchangeably used herein), a plurality of NPs (e.g., disease NPs/rare disease NPs) from one or more medical literatures. The above step 204 is better understood by way of following description. The system 100 detects NPs from all MEDLINE articles. In the present disclosure, Natural Language Toolkit (NLTK) based Parts of Speech (POS) tagging and NP chunking (e.g., Loper and Bird, 2002) are used to identify relevant NPs at sentence level. To address the challenges of long and complex rare disease phrases, the system 100 executed both pattern and n-gram based chunkers of NLTK. Pattern-based NP chunkers rely on regular expressions using POS tags, and these can be customized to identify long NPs involving compound nouns, prepositions, adjectives, numerals, determiners, and conjunctions. In one embodiment, the pattern-based noun phrase chunking comprises a set of pre-defined patterns, and the n-gram-based noun phrase chunking comprises at least one of a pre-trained unigram, a pre-trained bigram, and a pre-trained trigram machine learning (ML) model on a pre-defined corpus. For the n-gram based chunking, the system 100 implemented the pre-trained trigram chunking model trained on the CONLL training corpus [CoNLL-2003-a predefined corpus]. Bigram and unigram models were also included for sequential back-off. In other words, the pattern-based NP chunking comprised a set of pre-defined patterns (e.g., {<N.*|JJ>+ (<IN|TO|CD|DT>?<N.*|JJ|VB>?|<CC><N.*|JJ>? <IN|TO|CD|DT>?)*}), and the n-gram-based NP chunking comprised a trained machine-learning (ML) model for NP recognition. Example of noun phrases generated as outputs using the above pattern is illustrated below:

TABLE 1

| Article ID | Term |
| --- | --- |
| 14562578 | syndromic bile duct paucity |
| 14302144 | BILIARY CIRRHOSIS DUE TO CONGENITAL BILE DUCT ATRESIA |
| 17228820 | infantile GM1 gangliosidosis with progressive dilatation of common bile duct |
| 18558159 | adenocarcinoma of the intrahepatic bile duct |

Table 2 below depicts by way of illustrative examples; the PubMed article identifier, the actual NP mention in the article as extracted by the noun phrase chunker, the normalized NP form of the mention, and its word count:

TABLE 2

| PubMed Identifier | Actual NP | Normalized NP | Word count |
| --- | --- | --- | --- |
| 17867206 | Primary Carcinoma of the Common Bile-Duct | primary carcinoma of the common bile duct | 7 |
| 20897034 | Great Enlargement of the Liver due to Primary Carcinoma of the Extra-hepatic Bile-ducts | great enlargement of the liver due to primary carcinoma of the extra hepatic bile ducts | 15 |
| 20267413 | Carcinoma of the extrahepatic bile ducts | carcinoma of the extrahepatic bile ducts | 6 |
| 20238762 | Bile duct cell carcinoma | bile duct cell carcinoma | 4 |
| 20293117 | Carcinoma of common bile duct | carcinoma of common bile duct | 5 |

Referring to step 206 of the method of the present disclosure, the one or more hardware processors 104 identify a plurality of relevant NPs from the plurality of NPs based on a comparison of the plurality of NPs with one or more seed terms comprised in a seed dictionary. More specifically, the relevant NPs are identified by performing a syntactic overlapping of the plurality of NPs with one or more seed terms comprised in the seed dictionary. The above step 206 is better understood by way of following description: The system 100 selects an initial list of relevant NPs where each of them has at least 't' fraction overlap with any one of the one or more seed terms in the seed dictionary. The overlap fraction 't', which is a real value between 0 and 1, is a defined parameter (e.g., a user defined parameter and is configurable as per the requirement) and, in a sense, this allows controlling the syntactic similarity of the fetched terms to the seed dictionary terms. This allows controlling the specificity of the fetched terms. Furthermore, this results in a significant pruning of the millions of NPs present in the MEDLINE literatures to a smaller and a relevant initial list of terms. The one or more relevant NPs are identified that have at least a pre-defined syntactic overlap with the seed dictionary. In the present disclosure, the system 100 defined x % or more pre-defined syntactic overlap as a threshold wherein value of x is >=75. It is to be understood by a person having ordinary skill in the art or person skilled in the art that the threshold is configurable and may vary depending upon the use case/scenario and implementation of the system 100 and method of the present disclosure and such value of threshold shall not be construed as limiting the scope of the present disclosure. Table 3 below depicts by way of illustrative examples; the Orphanet identifier, the actual Orphanet term, the candidate terms, and the distance scores.

neighbor search data structure (e.g., a space-partitioning data structure as known in the art) of the seed dictionary

TABLE 3

| Orphanet ID | Orphanet term | Candidate term | Distance Score |
|---|---|---|---|
| 70567 | Bile duct cancer | bile duct cancer | 0.0 |
| 70567 | Bile duct cancer | bile duct cancer a | 0.0 |
| 70567 | Bile duct cancer | bile duct cancer with a | 0.0 |
| 70567 | Bile duct cancer | bile duct cancer with an | 0.0 |
| 70567 | Bile duct cancer | bile duct in cancer | 0.0 |
| 70567 | CCA | cca | 0.0 |
| 70567 | Cholangiocarcinoma | cholangiocarcinoma | 0.0 |
| 70567 | Cholangiocarcinoma | hepatocholangiocarcinoma | 2.1609611079391486 |
| 70567 | Bile duct cancer | cancer of the bile ducts | 2.943043306897923 |
| 70567 | Bile duct cancer | bile ducts cancer | 2.9430433426890454 |

At step 208 of the method of the present disclosure, the one or more hardware processors 104 perform a semantic analysis on the plurality of relevant NPs to identify one or more candidate terms for each seed term comprised in the seed dictionary. The step of performing the semantic analysis on the plurality of relevant NPs to identify the one or more candidate terms for each seed term comprised in the seed dictionary comprises obtaining word2vec vectors for each relevant NP from the plurality of relevant NPs and each seed term comprised in the seed dictionary, by using a word2vec embedding technique (e.g., a technique as known in the art). The above step of obtaining word2vec vectors for each relevant NP from the plurality of relevant NPs and each seed term comprised in the seed dictionary, by using the word2vec embedding technique is better understood by way of following description: Semantic embedding of the plurality of relevant NPs identified in the previous step is carried out and rank ordered based on their similarity to the seed dictionary terms. To achieve this, the system 100 first computes a domain-specialized semantic embedding of both the NPs and the seed dictionary terms using word2vec embedding (e.g., refer Mikolov et al, 2013). A domain-specialized word2vec model pre-trained on MEDLINE and MIMIC3 (e.g., Johnson et al, 2016) was used for this purpose.

Further, for each relevant NP, the system 100 computes the one or more candidate terms by finding one or more k-nearest neighbors from each seed dictionary term as described below. The system 100 built a KD-tree nearest terms using their semantic embedding to perform efficient semantic similarity search between the initial terms (the plurality of relevant NPs) and the seed dictionary terms. For each relevant NP, the one or more candidate terms are computed by finding its nearest neighbor amongst the seed dictionary terms by querying the KD-tree and computing a Euclidean distance between the relevant NP and the seed dictionary terms. The Euclidean distance computation using KD-tree is known in the art.

Referring to steps of FIG. 3, at step 210 of the method of the present disclosure, the one or more hardware processors 104 apply one or more filtering techniques on the one or more candidate terms to obtain one or more augmentation terms. The one or more filtering techniques comprise at least one of an inflection technique, a plural form identification technique, a difference technique, a thresholding technique, and a special character identification technique. The above step 210 is better understood by way of following description. Terms that are exact matches of seed dictionary terms or are minor linguistic variations of seed dictionary terms are removed from the rank ordered output. Minor linguistic variations include inflections, plural forms, differences in case and presence of special characters. Such terms do not really constitute as new and hence does not add value to the output. The system 100 applies cosine similarity as a thresholding technique. Computing the cosine similarity is known in the art. The cosine similarity is computed between each candidate term and one or more seed dictionary terms using their semantic embedding. Table 4 depicts a list of candidate terms along with their matched types on which filtering techniques are applied.

TABLE 4

| Matched Type | Orphanet ID | Orphanet term | Candidate term | Distance Score |
|---|---|---|---|---|
| em | 70567 | Bile duct cancer | bile duct cancer | 0.0 |
| em | 70567 | CCA | CCA | 0.0 |
| em | 70567 | Cholangiocarcinoma | Cholangiocarcinoma | 0.0 |
| pI | 70567 | Bile duct cancer | bile ducts cancer | 2.9430433426890454 |
| pI | 70567 | Bile duct cancer | bile duct tumors | 4.859762391487907 |
| sem | 70567 | Bile duct cancer | cancer of the bile ducts | 2.943043306897923 |
| sem | 70567 | Bile duct cancer | biliary duct cancer | 3.67747958581116 |
| sem | 70567 | Bile duct cancer | bile duct, breast | 3.759283837894476 |
| sem | 70567 | Bile duct cancer | bile duct carcinoma | 3.845893756963155 |
| sem | 70567 | Bile duct cancer | Carcinoma of bile duct | 3.845893784012475 |

In the above Table 4, em refer to 'exact match'; pl refers to 'plural', and sem refers to 'semantic'

The above step of augmentation is better understood by way of Table 5.

TABLE 5

| Orphanet ID | Orphanet term | Augmentation term |
|---|---|---|
| 3402 | Transient tyrosinemia of the newborn | transient neonatal tyrosinemia |
| 457246 | Clear cell sarcoma of kidney | Clear cell renal sarcoma |
| 47044 | Hereditary papillary renal cell carcinoma | Familial papillary renal cell carcinoma |
| 70567 | Bile duct cancer | Carcinoma of bile duct |
| 88637 | Hypomyelination-hypogonadotropic hypogonadism-hypodontia syndrome | hypomyelination, hypodontia, hypogonadotropic, hypogonadism syndrome |
| 3306 | Inverted duplicated chromosome 15 syndrome | syndrome of the inverted duplication of chromosome 15 |
| 295225 | Congenital elbow dislocation, unilateral | Unilateral congenital elbow luxation |

Table 6 shows a sample of related terms that are of potential interest. These are terms that, while unmatched to the seed dictionary terms, can be possible new rare disease terms.

TABLE 6

| Orphanet term | Augmented Related term |
|---|---|
| chronic primary adrenal insufficiency | acute primary adrenal insufficiency |
| adenocarcinoma of the small bowel | adenocarcinoma of the large bowel |
| leiomyosarcoma of small intestine | angiosarcoma in the small intestine |
| atresia of small intestine | atresia of the large intestine |
| Low-flow priapism | High-flow priapism |
| Acid beta-glucosidase deficiency | acid alpha-glucosidase deficiency |

System of the present disclosure demonstrates through experiments, the utility of the method by processing MEDLINE (e.g., medical literatures). The system 100 executed the method of the present disclosure depicted in FIG. 3 on MEDLINE. n the first setting, denoted as the standard search, the PubMed search was performed for a rare disease using only the Orphanet seed dictionary terms as the query terms. In the second setting, denoted as the augmented search, the newly recommended synonyms were also included along with the Orphanet terms while searching PubMed for a rare disease. In the augmented search, as compared to the standard search, an additional 115,749 abstracts were retrieved from PubMed, each containing a mention of the queried rare disease. These additional abstracts were missed in the standard search since all mentions of the queried rare disease in these abstracts did not match any of the seed dictionary terms for that disease. Interestingly, for some of the Orphanet rare diseases, standard search output was empty whereas the augmented search retrieved matched articles. This shows the utility of augmented dictionaries with a comprehensive set of synonyms in the standard IR tasks.

Embodiments of the present disclosure provide systems and methods for augmenting rare disease dictionaries. As can be observed through experimental results mentioned above, increased coverage of dictionary resources can help in improving the performance of a wide range of information retrieval (IR) and information extraction (IE) tasks, and in building high quality ontologies. Increased coverage of dictionary resources can help in improving the performance of a wide range of IR and IE tasks, and in building high quality ontologies. The system and method of the present disclosure present a text-mining pipeline that retrieves candidate terms from MEDLINE for a given collection of rare disease dictionary terms. The method of the present disclosure can in principle be used to process MEDLINE and update the dictionaries in a periodic fashion. It is straightforward to incorporate additional features such as filtering the output based on a subset of rare disease terms of interest, and to show the relevant source text segments from MEDLINE along with the augmentation terms.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, further comprising:
obtaining, via one or more hardware processors, one or more medical literatures as an input;
extracting, by using at least one of a pattern-based noun phrase (NP) chunking and a n-gram-based NP chunking via the one or more hardware processors, a plurality of NPs from one or more medical literatures;
identifying, via the one or more hardware processors, a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms;
performing, via the one or more hardware processors, a semantic analysis on the plurality of relevant NPs to identify one or more candidate terms for each seed term comprised in the seed dictionary; and
applying, via the one or more hardware processors, one or more filtering techniques on the one or more candidate terms to obtain one or more augmentation terms.

2. The processor implemented method of claim 1, wherein the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus.

3. The processor implemented method of claim 1, wherein the comparison comprises performing a syntactic overlapping of the plurality of NPs with the seed dictionary.

4. The processor implemented method of claim 1, wherein the one or more relevant NPs have at least a pre-defined syntactic overlap with the seed dictionary.

5. The processor implemented method of claim 1, wherein the step of performing the semantic analysis on the plurality of relevant NPs to identify the one or more candidate terms for each seed term comprised in the seed dictionary comprises:
obtaining word2vec vectors for each relevant NP from the plurality of relevant NPs and each seed term comprised in the seed dictionary, by using a word2vec embedding technique;
computing, for each relevant NP, one or more k-nearest neighbors from each seed term comprised in the seed dictionary; and
applying a cosine similarity function and a Euclidean distance to the one or more k-nearest neighbors from each relevant NP amongst the plurality of relevant NPs to identify the one or more candidate terms.

6. The processor implemented method of claim 1, wherein the one or more filtering techniques comprise at least one of an inflection technique, a plural form identification technique, a difference technique, and a special character identification technique.

7. The processor implemented method of claim 1, wherein the step of obtaining, via the one or more hardware processors, one or more medical literatures as the input is preceded by:
selecting, via the one or more hardware processors, a pre-defined rare disease database from a plurality of rare disease databases; and
generating, via the one or more hardware processors, the seed dictionary for the one or more rare diseases, using the pre-defined rare disease database.

8. The processor implemented method of claim 1, further comprising augmenting the seed dictionary with the one or more augmentation terms associated with one or more rare diseases terms.

9. A system, comprising:
a memory storing instructions;
one or more communication interfaces; and
one or more hardware processors coupled to the memory via the one or more communication interfaces, wherein the one or more hardware processors are configured by the instructions to:
obtain one or more medical literatures as an input;
extract, by using at least one of a pattern-based NP chunking and a n-gram-based NP chunking, a plurality of NPs from one or more medical literatures;
identify a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms;
perform a semantic analysis on the plurality of relevant NPs to identify one or more candidate terms for each seed term comprised in the seed dictionary; and
apply one or more filtering techniques on the one or more candidate terms to obtain one or more augmentation terms.

10. The system of claim 9, wherein the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus.

11. The system of claim 9, wherein the comparison comprises performing a syntactic overlapping of the plurality of NPs with the seed dictionary.

12. The system of claim 9, wherein the one or more relevant NPs have at least a pre-defined syntactic overlap with the seed dictionary.

13. The system of claim 9, wherein the semantic analysis comprises:

obtaining word2vec vectors for each relevant NP from the plurality of relevant NPs and each seed term comprised in the seed dictionary, by using a word2vec embedding technique;

computing, for each relevant NP, one or more k-nearest neighbors from each seed term comprised in the seed dictionary; and applying a cosine similarity function and a Euclidean distance to the one or more k-nearest neighbors from each relevant NP amongst the plurality of relevant NPs to identify the one or more candidate terms.

14. The system of claim 9, wherein the one or more filtering techniques comprise at least one of an inflection technique, a plural form identification technique, a difference technique, and a special character identification technique.

15. The system of claim 9, wherein prior to obtaining the one or more medical literatures the one or more hardware processors is configured to:

select a pre-defined rare disease database from a plurality of rare disease databases; and generate the seed dictionary for the one or more rare diseases, using the pre-defined rare disease database.

16. The system of claim 9, wherein the one or more hardware processors are further configured by the instructions to augment the seed dictionary with the one or more augmentation terms associated with one or more rare diseases terms.

17. One or more non-transitory machine-readable information storage mediums comprising one or more instructions which when executed by one or more hardware processors cause:

obtaining one or more medical literatures as an input;

extracting, by using at least one of a pattern-based noun phrase (NP) chunking and a n-gram-based NP chunking, a plurality of NPs from one or more medical literatures;

identifying a plurality of relevant NPs from the plurality of NPs based on a comparison of the plurality of NPs with one or more seed terms comprised in a seed dictionary, wherein the seed dictionary comprises a plurality of records pertaining to one or more rare diseases, and wherein each record from the plurality of records comprises an identifier (ID), a rare disease name, and one or more associated synonyms;

performing a semantic analysis on the plurality of relevant NPs to identify one or more candidate terms for each seed term comprised in the seed dictionary; and applying one or more filtering techniques on the one or more candidate terms to obtain one or more augmentation terms.

18. The one or more non-transitory machine-readable information storage mediums of claim 17, wherein the pattern-based noun phrase chunking comprises a set of pre-defined patterns, and the n-gram-based noun phrase chunking comprises at least one of a pre-trained unigram, a pre-trained bigram and a pre-trained trigram machine learning (ML) model on a pre-defined corpus, wherein the comparison comprises performing a syntactic overlapping of the plurality of NPs with the seed dictionary, wherein the one or more relevant NPs have at least a pre-defined syntactic overlap with the seed dictionary, wherein the step of performing the semantic analysis on the plurality of relevant NPs to identify the one or more candidate terms for each seed term comprised in the seed dictionary comprises:

obtaining word2vec vectors for each relevant NP from the plurality of relevant NPs and each seed term comprised in the seed dictionary, by using a word2vec embedding technique;

computing, for each relevant NP, one or more k-nearest neighbors from each seed term comprised in the seed dictionary; and applying a cosine similarity function and a Euclidean distance to the one or more k-nearest neighbors from each relevant NP amongst the plurality of relevant NPs to identify the one or more candidate terms, and wherein the one or more filtering techniques comprise at least one of an inflection technique, a plural form identification technique, a difference technique, and a special character identification technique.

19. The one or more non-transitory machine-readable information storage mediums of claim 17, wherein the step of obtaining one or more medical literatures as the input is preceded by:

selecting a pre-defined rare disease database from a plurality of rare disease databases; and generating the seed dictionary for the one or more rare diseases using the pre-defined rare disease database.

20. The one or more non-transitory machine-readable information storage mediums of claim 17, wherein the one or more instructions which when executed by the one or more hardware processors further cause augmenting the seed dictionary with the one or more augmentation terms associated with one or more rare diseases terms.

* * * * *